United States Patent
Auer et al.

(10) Patent No.: US 8,936,124 B2
(45) Date of Patent: Jan. 20, 2015

(54) FASTENING DEVICE

(75) Inventors: Thomas Auer, Metnitz (AT); Martin Rodler, Krottendorfer (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 78 days.

(21) Appl. No.: 13/639,900

(22) PCT Filed: Apr. 8, 2011

(86) PCT No.: PCT/EP2011/055544
§ 371 (c)(1),
(2), (4) Date: Oct. 8, 2012

(87) PCT Pub. No.: WO2011/124700
PCT Pub. Date: Oct. 13, 2011

(65) Prior Publication Data
US 2013/0037337 A1 Feb. 14, 2013

Related U.S. Application Data

(60) Provisional application No. 61/321,936, filed on Apr. 8, 2010, provisional application No. 61/322,289, filed on Apr. 9, 2010.

(51) Int. Cl.
*B60K 1/04* (2006.01)
*H01M 2/10* (2006.01)
(52) U.S. Cl.
CPC .............. *B60K 1/04* (2013.01); *H01M 2/1083* (2013.01); *B60K 2001/0472* (2013.01); *Y10S 903/951* (2013.01)
USPC ........................................ 180/68.5; 903/951

(58) Field of Classification Search
CPC ............. B60K 1/04; B60K 2001/0433; B60K 2001/0438; B60K 2001/0472; B60R 16/04; B60S 5/06
USPC .................................. 180/68.5; 903/907, 951
See application file for complete search history.

(56) References Cited

U.S. PATENT DOCUMENTS

| | | | | |
|---|---|---|---|---|
| 1,079,709 A | * | 11/1913 | Lloyd .......................... | 180/68.5 |
| 1,661,779 A | * | 3/1928 | Ward et al. ................... | 180/68.5 |
| 4,044,852 A | * | 8/1977 | Lewis et al. ................. | 180/206.4 |
| 4,087,895 A | * | 5/1978 | Etienne .......................... | 29/252 |
| 6,938,553 B2 | * | 9/2005 | Tamaki et al. .................. | 104/34 |
| 7,258,184 B2 | * | 8/2007 | Shorney et al. .............. | 180/68.5 |

FOREIGN PATENT DOCUMENTS

JP  2001-088563  *  4/2001  ............... B60K 1/04

* cited by examiner

*Primary Examiner* — Frank Vanaman
(74) *Attorney, Agent, or Firm* — Jordan IP Law, LLC; Todd A. Vaughn

(57) ABSTRACT

A fixing device for releasable fixing an electrical energy accumulator to a carrying structure of a motor vehicle includes a retaining protrusion and a locking catch which are provided on the energy accumulator and on the carrying structure (or vice versa). To fix the energy accumulator to the carrying structure, a relative movement of the retaining protrusion to the locking catch is provided along a movement track in the direction of an end position, in which the locking catch can be swiveled between a release position and a locked position such that in the release position the locking catch is outside the movement track of the retaining protrusion and in the locked position the locking catch protrudes into the movement track of the retaining protrusion and there engages behind the retaining protrusion when the retaining protrusion is in the end position.

19 Claims, 5 Drawing Sheets ns of US 8,936,124 B2

FASTENING DEVICE

CROSS-REFERENCE TO RELATED APPLICATIONS

The present application is a National Stage Application of PCT International Application No. PCT/EP2011/055544 (filed on Apr. 8, 2011), under 35 U.S.C. §371, which claims priority to U.S. Provisional Patent Application No. 61/322,289 (filed on Apr. 9, 2010) and U.S. Provisional Patent Application No. 61/321,936 (filed on Apr. 8, 2010), which are each hereby incorporated by reference in their respective entireties.

FIELD OF THE INVENTION

The present invention concerns a fixing device for releasable fixing of an electrical energy accumulator to a carrying structure of a motor vehicle, in particular an electric vehicle or a hybrid vehicle.

BACKGROUND OF THE INVENTION

Electric or hybrid vehicles have an electric drive motor which transmits a torque to the vehicle wheels. The energy to operate the electric drive motor is taken from the energy accumulator, which in particular can be a rechargeable battery, i.e., an accumulator. Usually such a battery has an array of galvanic cells accommodated in a housing. The battery can, for example, be bolted to the chassis of the motor vehicle.

When a battery change is required on the vehicle, the bolted connection between the battery and the vehicle must be released and after removal of the old battery, a replacement battery bolted in. Because of wear on the thread, the reliability of the bolted connection can deteriorate, in particular on frequent replacement procedures. Furthermore a bolted connection with a safety-critical character requires a relatively high installation complexity e.g. in the form of particularly detailed documentation.

SUMMARY OF THE INVENTION

The object of the invention is, therefore, to make the releasable fixing of an energy accumulator to the chassis of a motor vehicle simpler and safer.

The object is achieved by a fixing device for releasable fixing of an electrical energy accumulator to a carrying structure of a motor vehicle, in particular a hybrid or electric vehicle, with a retaining protrusion and a locking catch which are provided on the energy accumulator and on the carrying structure or vice versa, wherein to fix the energy accumulator to the carrying structure, a relative movement of the retaining protrusion to the locking catch is provided along a movement track in the direction of an end position, wherein the locking catch can be swiveled about a swivel axis between a release position and a locked position such that in the release position the locking catch is outside the movement track of the retaining protrusion and in the locked position the locking catch protrudes into the movement track of the retaining protrusion and there engages behind the retaining protrusion when the retaining protrusion is in the end position.

In accordance with the invention, a fixing device comprises a retaining protrusion and a locking catch which are provided on the energy accumulator and on the carrying structure or vice versa, wherein to fix the energy accumulator to the carrying structure, a relative movement of the retaining protrusion to the locking catch is provided along a movement track in the direction of an end position, wherein the locking catch can be swiveled about a swivel axis between a release position and a locked position, that in the release position the locking catch is outside the movement track of the retaining protrusion and that in the locked position the locking catch protrudes into the movement track of the retaining protrusion and there engages behind the retaining protrusion when the retaining protrusion is in the end position.

The movement track can be rectilinear. The movement direction runs preferably vertical, for example, in that an energy accumulator with retaining protrusion is brought from below up to the carrying structure of the vehicle. In principle the movement track can also be curved, in particular circular. A circular movement track is present for example if the energy accumulator is suspended at one point on the carrying structure and is then swiveled. The movement track of the retaining protrusion essentially means the projection of the retaining protrusion along the movement direction. The only essential factor here is the relative movement between the retaining protrusion and the locking catch, i.e. the locking catch can also be provided on the energy accumulator and the retaining protrusion on the carrying structure. Because of the engagement behind the retaining protrusion by the locking catch, there is a secure, form-fit connection between the energy accumulator and the vehicle chassis. Replacement of the energy accumulator is therefore possible simply and quickly as the locking catch need merely be swiveled.

Refinements of the invention are described in the secondary claims, the description and the enclosed drawings.

In accordance with one embodiment of the invention, the swivel axis of the locking catch is arranged outside the movement track of the retaining protrusion and is set back in relation to the end position of the retaining protrusion, i.e., arranged behind the end position viewed in the movement direction of the retaining protrusion. Thus the retaining protrusion can be moved past the locking catch and the locking catch can, in the corresponding swivel position, engage behind the retaining protrusion when the latter is in the end position.

The locking catch can have a supporting segment which lies on the retaining protrusion when the retaining protrusion is in the end position and the locking catch is in the locked position, wherein the distance of the supporting segment from the swivel axis of the locking catch is greater than the depth of the retaining protrusion, i.e., than the distance of the tip of the retaining protrusion from the attachment of the retaining protrusion at the energy accumulator or carrying structure. Thus the swivel radius of the locking catch is relatively large, whereby because of the lever effect an effective and reliable locking is achieved.

Alternatively or additionally, the locking catch can comprise a supporting segment which lies on the retaining protrusion when the retaining protrusion is in the end position and the locking catch is in the locked position, wherein the supporting segment is oriented substantially tangentially in relation to the swivel axis of the locking catch i.e. substantially following the tangent to an orbit about the swivel axis. With such a tangential orientation of the supporting segment, only a minimal stroke beyond the end position is required to swivel the locking catch back into the release position. Preferably the supporting segment has a convex curvature to allow the locking catch to move past the retaining protrusion on swiveling out of the engagement position.

In accordance with a further embodiment of the invention, the retaining protrusion (in particular the face cooperating with the locking catch) is oriented obliquely in relation to its movement track. Such an oblique orientation supports a wedging effect of the locking catch.

Preferably, the locking catch is pretensioned in the locked position. This allows automatic locking of the energy accumulator when positioned on the carrying structure.

Furthermore the retaining protrusion can have a run-up chamfer for temporarily pressing back the locking catch into the release position. Such a run-up chamfer, which preferably runs completely around a face of the energy accumulator, facilitates the introduction of the energy accumulator into its holder in that it allows the locking catch to be pressed away into the release position more easily when the retaining protrusion moves past the locking catch. In addition a run-up chamfer can serve generally as an insertion aid if the energy accumulator is to be accommodated for example in a receiving chamber.

The fixing device can comprise an unlocking device by means of which the locking catch can be swiveled into the release position. Preferably the unlocking device is designed such that a swiveling of the locking catch into the release position is possible from a location which lies outside the movement track of the retaining protrusion. After activation of the unlocking device therefore the locking catch can move past the retaining protrusion unhindered.

The unlocking device can comprise a swivelable lever which, when a lever arm is swiveled up, swivels the locking catch into the release position. The locking catch can in principle swivel back automatically under gravity, whereby operation is further simplified.

The unlocking device can furthermore comprise a linearly displaceable wedge with a chamfer surface which is adapted, on an unlocking movement, to press by means of the chamfer surface against a latching arm of the locking catch and hence swivel the locking catch into the release position. Activation of the unlocking device can in this way be made particularly simple.

The chamfer surface of the wedge can in particular cooperate with a contact roller mounted rotatably on the latching arm. Such a contact roller reduces the friction resistance and thus allows easier activation of the unlocking device.

The fixing device can furthermore comprise a sensor to detect the swivel position of the locking catch. In accordance with one embodiment as a sensor a microswitch is provided which indicates the reaching of the release position and/or the locked position of the locking catch. In this way the locking between the energy accumulator and vehicle can be verified, which can be desirable in particular for safety reasons.

The invention furthermore comprises a fixing system with at least one fixing device as explained above and with a carrying structure which forms a receiving chamber for an electrical energy accumulator. The locking catch of the fixing device can here in particular be provided on the side segment of the carrying structure.

The fixing system can comprise several fixing devices, wherein at least two locking catches are provided on opposing side segments of the carrying structure. The locking catches are preferably formed such that the energy accumulator is held in the receiving chamber exclusively by the locking catches. Additional retaining measures are not therefore required, so that a particularly simple construction is possible.

In accordance with one embodiment of the invention, in the usage position of the carrying structure, the receiving chamber can be open at the bottom. To attach the energy accumulator to the carrying structure, this is moved into the receiving chamber from below. This can, e.g., take place using a suitable lifting device.

Furthermore on the carrying structure can be provided at least one in particular upper stop for the energy accumulator, wherein the respective locking catch is arranged such that the energy accumulator lies against the stop when the locking catch engages behind the retaining protrusion in the locked position. In this embodiment, after a fixing process the energy accumulator is clamped between the upper stop and a supporting segment of the locking catch so as to guarantee secure fixing of the energy accumulator and in particular avoid undesirable play.

An elastically deformable damping element can be provided on the stop to reduce undesirable noise and vibration.

The invention relates to an energy accumulator system for a motor vehicle with at least one electrical energy accumulator and with several fixing devices of the type described to attach the energy accumulator to a carrying structure of the motor vehicle.

BRIEF DESCRIPTION OF THE DRAWINGS

The invention is now explained below as an example with reference to the drawings, in which.

DETAILED DESCRIPTION OF EMBODIMENTS

Figure 1:
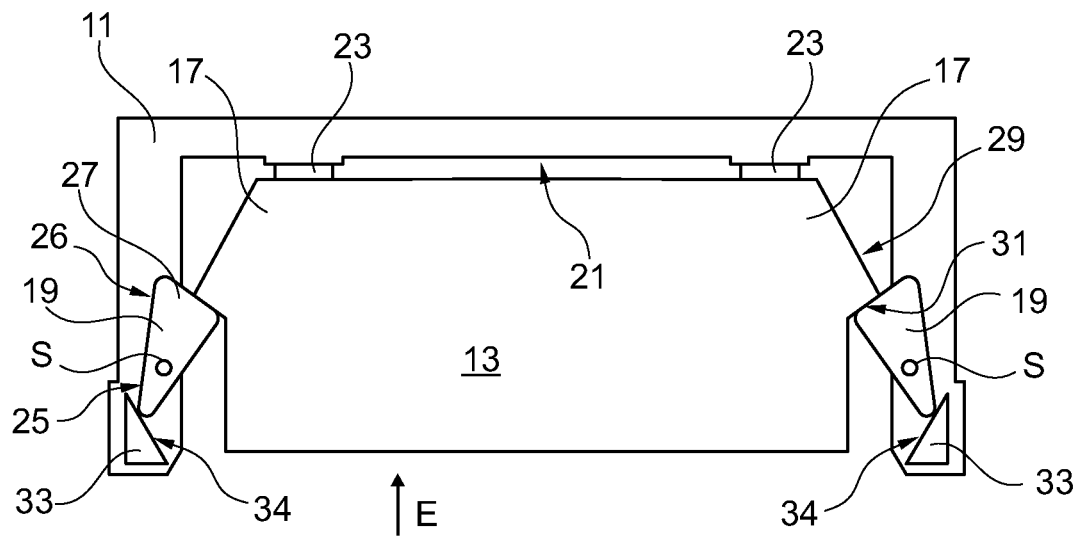
FIG. 1 illustrates a carrying structure of a motor vehicle on which an electrical energy accumulator is attached by means of the fixing device in accordance with the invention.

As illustrated in FIG. 1, an electrical energy accumulator 13, which can for example be a rechargeable battery, is attached to a carrying structure 11 of a motor vehicle not illustrated in more detail. The carrying structure 11 thus forms a receiving chamber open at the bottom for the energy accumulator 13, into which this can be introduced in an insertion direction E. The energy accumulator 13 has a substantially cubic housing 15 on which is formed a peripheral retaining protrusion 17. The energy accumulator 13 lies on an upper stop surface 21 of the carrying structure 11, wherein elastic damping elements 23 are provided on the stop surface 21 to reduce noise and vibration. At the bottom the energy accumulator 13 is secured by an arrangement of locking catches 19 which wedge themselves in the retaining protrusion 17.

Figure 2:
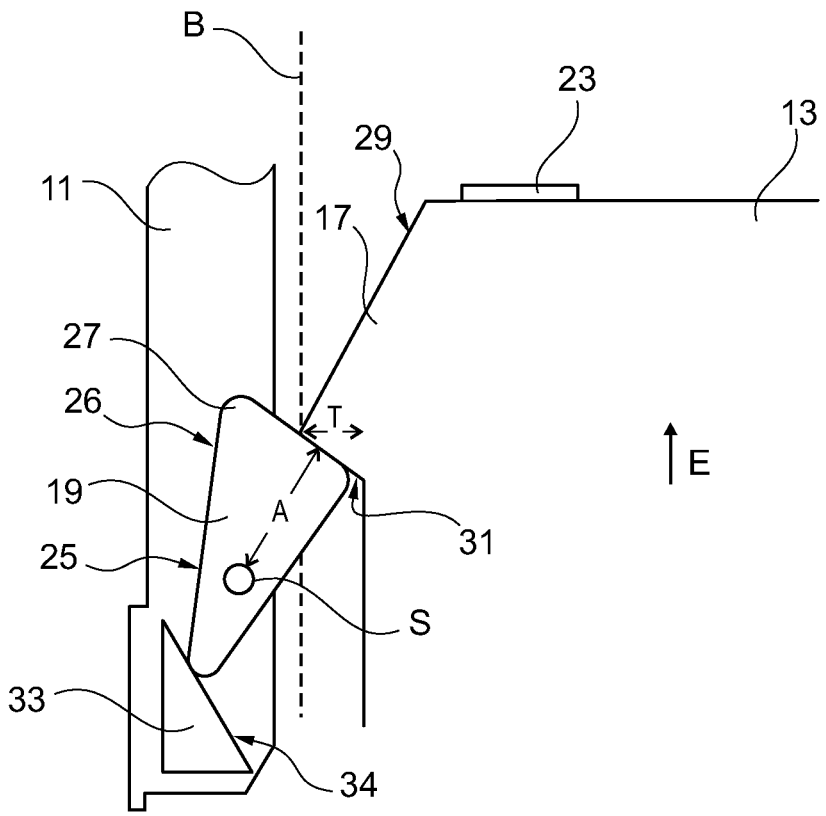
FIG. 2 illustrates an enlarged part view of the arrangement of FIG. 1 which illustrates a locking catch of the fixing device in more detail.

As illustrated in FIG. 2 the locking catches 19 can each be mounted in the carrying structure 11 and swivelable about a swivel axis S running transverse to the insertion direction E, and comprise a first latching arm 25 and a second latching arm 26. These are wedge-shaped in cross section and comprise an upper supporting segment 27 with convex curvature in relation to the swivel axis S. The distance A of the supporting segment 27 from the swivel axis S is here greater than the depth T of the retaining protrusion 17.

The retaining protrusion 17 is triangular in cross section and has a front chamfer surface 29 and a rear chamfer surface 31 in relation to the insertion direction E. The rear chamfer surface 31 is formed such that in relation to the swivel axis S, it runs tangentially to the supporting segment 27 of the locking catch 19. A wedge 33 with a chamfer surface 34 is mounted displaceable parallel to the insertion direction E in the carrying structure 11, and on displacement presses with the chamfer surface 34 on the first latching arm 25 of the locking catch 19 such that this is swiveled from the locked position illustrated in FIGS. 1 and 2 to the left in the picture into a release position.

Figure 3:
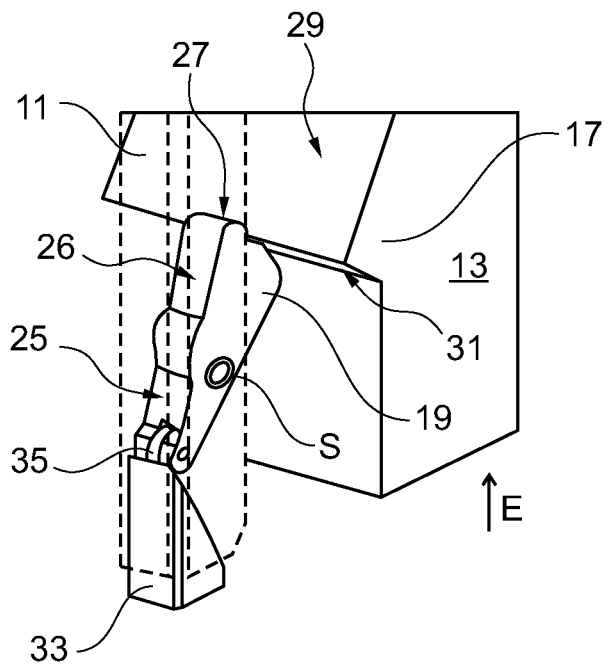
FIG. 3 illustrates a perspective view of the arrangement of FIG. 2.

As illustrated in FIG. 3, in the perspective view of the locking catch 19, a contact roller 35 can be seen which is provided at the end of the first latching arm 25 to reduce the friction resistance between the first latching arm 25 and the chamfer surface 34 of the wedge 33.

Figure 4:
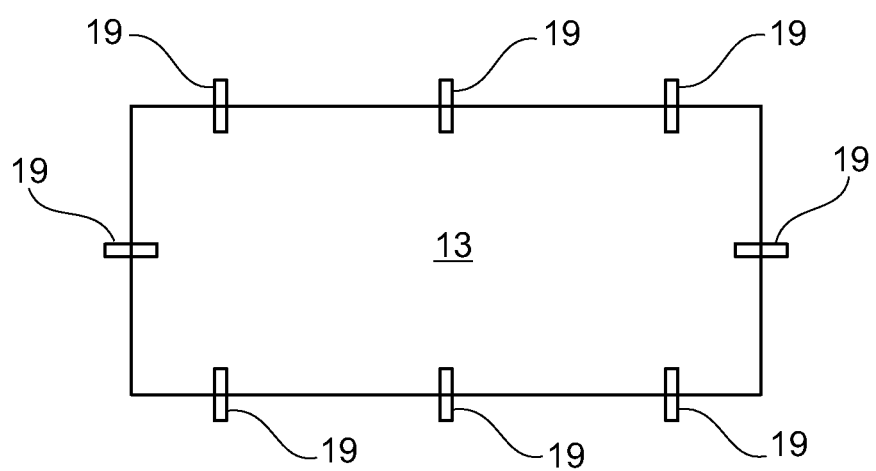
FIG. 4 illustrates a view of an energy accumulator from below, which clarifies its fixing to a carrying structure of a motor vehicle by means of several fixing devices of FIG. 2.
Figure 5:
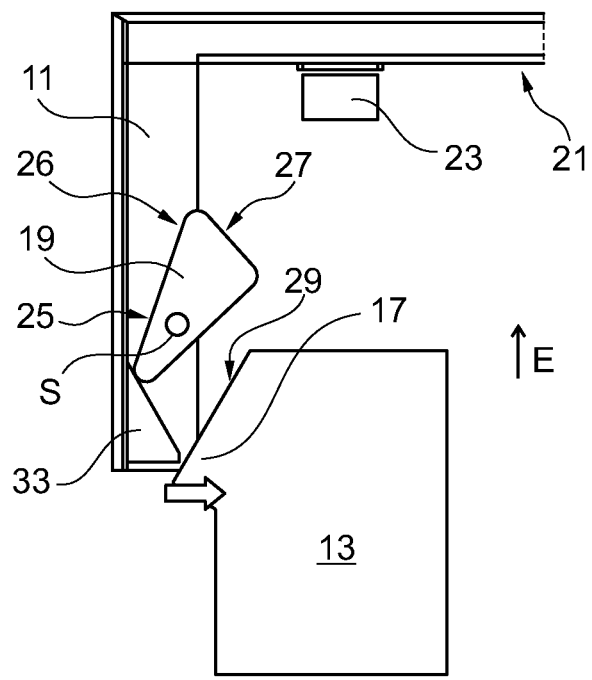
FIGS. 5 to 8 illustrate various phases of insertion of an energy accumulator into a receiving cavity formed by the carrying structure.

FIG. 4 illustrates as an example an arrangement of eight fixing devices as described above which are provided on opposing sides of the receiving cavity and which serve to fix the energy accumulator in the receiving chamber without the use of additional holders.

The fixing of an energy accumulator 13 in a receiving chamber formed by the carrying structure 11 is explained in more detail below with reference to FIGS. 5 to 8. The energy accumulator 13 is first roughly prepositioned and by means of a lifting device not illustrated, for example a driven lifting platform, is moved along the insertion direction E. Insofar as the energy accumulator 13 does not align precisely with the insertion opening of the receiving chamber, the front chamfer surface 29 of the retaining protrusion 17 reaches the limit of the receiving chamber, whereby the energy accumulator 13 is moved and centered as illustrated by an arrow in FIG. 5. To guarantee easier centering of the energy accumulator 13, this can be mounted on a friction-reducing support of the lifting device or floating.

Figure 6:
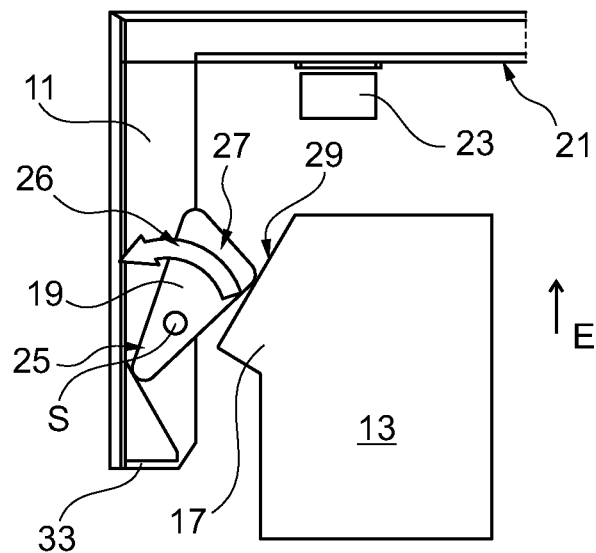
Figure 7:
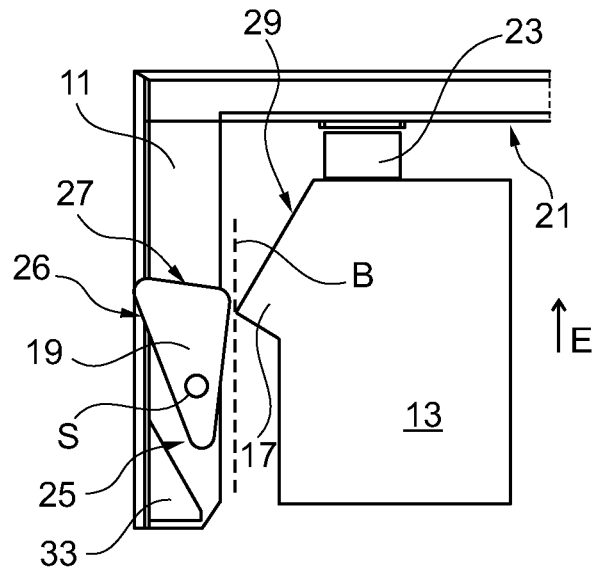

On further movement of the energy accumulator 13 along the insertion direction E, the retaining protrusion 17 describes a movement track B running parallel to the insertion direction E, causing the front chamfer surface 29 to come into contact with the second latching arm 26 of the locking catch 19 if this is in the locked position. The second latching arm 26 is then swiveled to the left as illustrated in FIG. 6, whereby the locking catch 19 moves into the release position illustrated in FIG. 7 in which it is outside the movement track B of the retaining protrusion 17. The energy accumulator 13 is then moved further along the insertion direction E until it stops on the upper stop surface 21 of the carrying structure 11. The movement track B in the embodiment illustrated is rectilinear. In other embodiments of the invention however it can also have a curve and in particular be circular.

Figure 8:
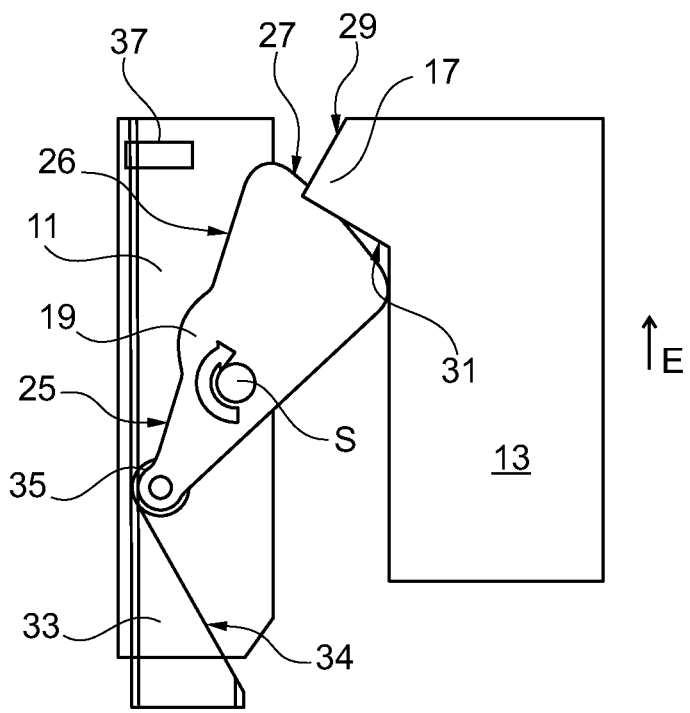

The retaining protrusion 17 is arranged and dimensioned such that at the same time as the energy accumulator 13 stops on the upper stop surface 21, the front chamfer surface 29 of the retaining protrusion 17 has moved sufficiently far past the locking catch 19 for this to be able to swivel back into the locked position under spring pretension, as illustrated in FIG. 8. In this position the energy accumulator 13 is wedged between the damping elements 23 and the supporting segment 27 of the locking catch 19, guaranteeing secure fixing of the energy accumulator 13 to the vehicle. The microswitch 37 indicated merely diagrammatically in FIG. 8 detects the reaching of the locked position by the locking catch 19 and reports this state to a control device of the vehicle, not illustrated.

Figure 9:
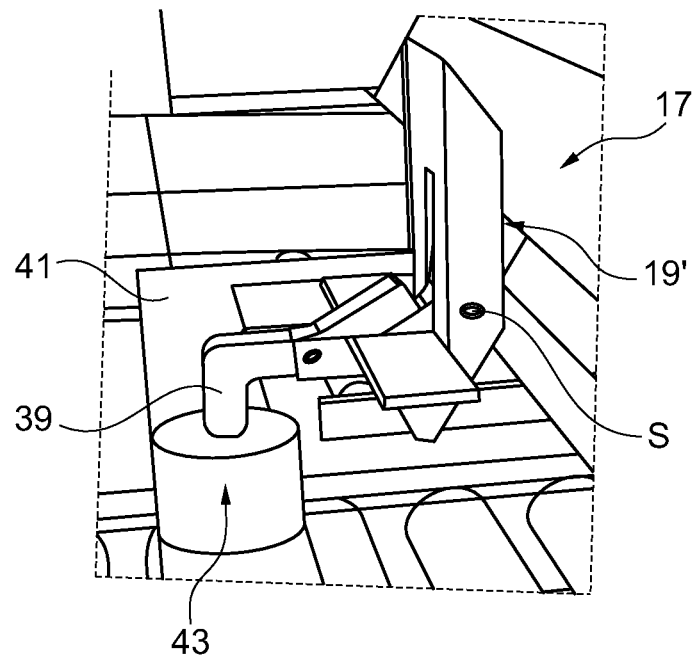
FIG. 9 illustrates a perspective view of a fixing device in accordance with an alternative embodiment of the invention.
Figure 10:
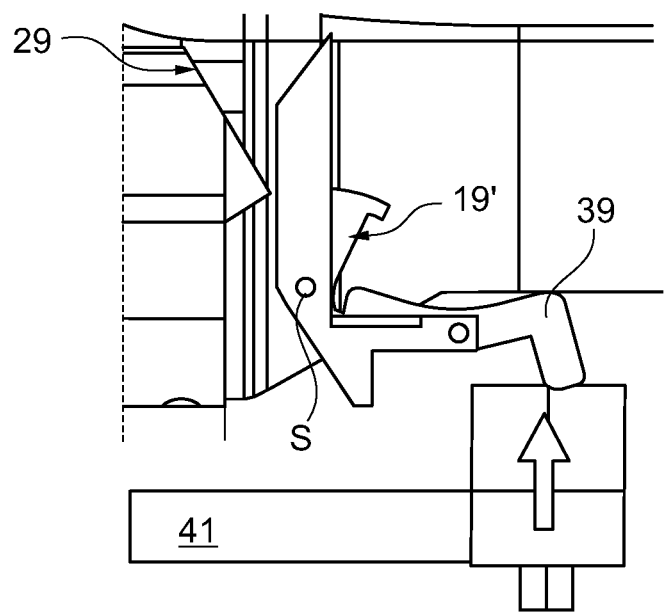
FIG. 10 illustrates a side view of the fixing device of FIG. 9.

FIGS. 9 and 10 illustrate an alternative embodiment of a fixing device according to the invention, wherein to unlock the locking catch 19' an additional activation lever 39 is provided which can be activated by a lifting device 41. In accordance with FIG. 10, on lifting of the energy accumulator 13 a protrusion 43 of the lifting device 41 presses on the activation lever 39 and thus presses the locking catch 19' into the release position. The energy accumulator 13 now released from the vehicle then contacts the support surface of the lifting device 41 and can then be lowered and removed. The fixing of a new energy accumulator 13 takes place as described above, wherein the steps are performed in reverse order.

In total, a fixing device according to the invention allows rapid and simple battery change in motor vehicles with an electric drive motor, wherein in particular wear-related deterioration of the holder is avoided.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS

11 Carrying structure
13 Energy accumulator
17 Retaining protrusion
19, 19' Locking catch
21 Stop surface
23 Damping element
27 First latching arm
26 Second latching arm
27 Supporting segment
29 Front chamfer surface
31 Rear chamfer surface
33 Wedge
34 Chamfer surface
35 Contact roller
37 Microswitch
39 Activating lever
41 Lifting device
43 Protrusion
E Insertion direction
B Movement track
S Swivel axis
A Distance
T Depth

What is claimed is:

1. A fixing device for releasable fixing a rechargeable battery to a carrying structure of a motor vehicle, the fixing device comprising:
   a locking catch provided on the carrying structure; and
   a retaining protrusion provided on the rechargeable battery and configured for movement relative to the locking catch along a movement track in a direction of an end position to fix the rechargeable battery to the carrying structure,
   wherein the locking catch is configured for pivoting movement about a pivot axis between a release position in which the locking catch is outside the movement track of the retaining protrusion and a locked position in which the locking catch protrudes into the movement track of the retaining protrusion and there engages behind the retaining protrusion when the retaining protrusion is in the end position, wherein the pivot axis of the locking catch is arranged outside the movement track of the retaining protrusion and spatially underneath the retaining protrusion when the retaining protrusion is in the end position.

2. The fixing device of claim 1, wherein:
the locking catch comprises a supporting segment which lies on the retaining protrusion when the retaining protrusion is in the end position and the locking catch is in the locked position; and
a distance of the supporting segment from the pivot axis of the locking catch is greater than the depth of the retaining protrusion.

3. The fixing device of claim 1, wherein:
the locking catch comprises a supporting segment which lies on the retaining protrusion when the retaining protrusion is in the end position and the locking catch is in the locked position; and
the supporting segment is oriented substantially tangentially in relation to the pivot axis of the locking catch.

4. The fixing device of claim 1, wherein the retaining protrusion is oriented obliquely in relation to the movement track.

5. The fixing device of claim 1, wherein the locking catch is pre-tensioned in the locked position.

6. The fixing device of claim 1, further comprising a chamfer provided on the retaining protrusion and configured to temporarily move the locking catch into the release position.

7. The fixing device of claim 1, further comprising an unlocking device configured to pivot the locking catch into the release position.

8. The fixing device of claim 7, wherein the unlocking device comprises a pivotable lever which, when a lever arm is pivoted in an upward direction, pivots the locking catch into the release position.

9. The fixing device of claim 7, wherein the unlocking device comprises a linearly displaceable wedge with a chamfer surface which is configured, in an unlocking movement, to press by way of the chamfer surface against a latching arm of the locking catch and thereby pivot the locking catch into the release position.

10. The fixing device of claim 9, further comprising a contact roller mounted rotateably on the latching arm and which is configured to operatively interact with the chamfer surface of the wedge.

11. The fixing device of claim 1, further comprising a sensor configured to detect the pivot position of the locking catch.

12. A fixing system for releasable fixing a rechargeable battery to a motor vehicle, the fixing system comprising:
a carrying structure which defines a receiving chamber for the rechargeable battery;
a fixing device including a locking catch provided on the carrying structure, and a retaining protrusion provided on the rechargeable battery and configured for movement relative to the locking catch along a movement track in a direction of an end position to fix the rechargeable battery to the carrying structure, wherein the locking catch is configured for pivoting movement about a pivot axis between a release position in which the locking catch is outside the movement track of the retaining protrusion and a locked position in which the locking catch protrudes into the movement track of the retaining protrusion and there engages behind the retaining protrusion when the retaining protrusion is in the end position, wherein the pivot axis of the locking catch is arranged spatially underneath the retaining protrusion when the retaining protrusion is in the end position.

13. The fixing system of claim 12, further comprising a plurality of fixing devices, wherein at least two locking catches are provided on opposing side segments of the carrying structure.

14. The fixing system of claim 12, further comprising a stop provided on the carrying structure, wherein a respective locking catch is arranged such that the rechargeable battery lies against the stop when the locking catch engages behind the retaining protrusion in the locked position.

15. A vehicle comprising:
a carrying structure which defines a receiving chamber for the rechargeable battery;
a rechargeable battery; and
a device for releasable fixing the rechargeable battery to the carrying structure, the device including:
a locking catch provided on the rechargeable battery; and
a retaining protrusion provided on the rechargeable battery and configured for movement relative to the locking catch along a movement track in a direction of an end position to fix the rechargeable battery to the carrying structure, wherein the locking catch is configured for pivoting movement about a pivot axis between a release position in which the locking catch is outside the movement track of the retaining protrusion and a locked position in which the locking catch protrudes into the movement track of the retaining protrusion and there engages behind the retaining protrusion when the retaining protrusion is in the end position, wherein the pivot axis of the locking catch is arranged spatially underneath the retaining protrusion when the retaining protrusion is in the end position.

16. The vehicle of claim 15, further comprising a chamfer provided on the retaining protrusion and configured to temporarily move the locking catch into the release position.

17. The vehicle of claim 15, further comprising an unlocking device configured to pivot the locking catch into the release position.

18. The vehicle of claim 15, further comprising a sensor configured to detect the pivot position of the locking catch.

19. The vehicle of claim 15, wherein:
the locking catch comprises a supporting segment which lies on the retaining protrusion when the retaining protrusion is in the end position and the locking catch is in the locked position; and
a distance of the supporting segment from the pivot axis of the locking catch is greater than the depth of the retaining protrusion.

* * * * *